United States Patent [19]

Sugiura et al.

[11] Patent Number: 4,886,630
[45] Date of Patent: Dec. 12, 1989

[54] METHOD OF PRODUCING SKIN-COVERED PAD FOR SEAT

[75] Inventors: Takashi Sugiura; Ichiro Matsuura; Fumio Miyauchi; Toyoharu Chiyoshi, all of Ayase, Japan

[73] Assignee: Ikeda Bussan Co., Ltd., Ayase City, Japan

[21] Appl. No.: 200,802

[22] Filed: May 26, 1988

[51] Int. Cl.$^4$ ............................................. B29C 51/00
[52] U.S. Cl. ................................. 264/46.6; 264/46.8; 264/265
[58] Field of Search ................... 264/46.4, 46.6, 46.8, 264/544, 265, 267, 268

[56] References Cited

U.S. PATENT DOCUMENTS

| 4,107,829 | 8/1978 | Urai et al. ............................ 29/91.1 |
| 4,676,938 | 6/1987 | Karklin et al. ...................... 264/46.8 |
| 4,806,088 | 2/1989 | Busch et al. ........................ 264/46.8 |

FOREIGN PATENT DOCUMENTS

| 263798 | 4/1988 | European Pat. Off. . |
| 3009885 | 7/1981 | Fed. Rep. of Germany . |
| 2439525 | 5/1980 | France . |
| 58-187322 | 11/1983 | Japan .................................. 264/46.6 |
| 60-160990 | 8/1985 | Japan . |
| 62-257825 | 11/1987 | Japan .................................. 264/46.8 |

999515 7/1965 United Kingdom .
2189183 10/1987 United Kingdom .............. 264/46.6

Primary Examiner—Jan H. Silbaugh
Assistant Examiner—Allan R. Kuhns
Attorney, Agent, or Firm—Foley & Lardner, Schwartz, Jeffery, Schwaab, Mack, Blumenthal & Evans

[57] ABSTRACT

A method of producing a skin-covered pad for a seat, which includes by steps (a) preparing a lower mold which has a cavity formed therein, the mold having projections on a bottom of the cavity; (b) putting a bag-shaped outer skin member into the cavity, the skin member being thermally plastic; (c) putting an upper mold on the lower mold to close the cavity, the upper mold having an aperture formed therethrough; (d) projecting a press member into the cavity through the aperture, the press member having at its work head recesses which are shaped to match with the projections of the lower mold; (e) pressing the recessed work head of the press member against the projections of the lower mold with an interposal of a part of the outer skin member therebetween; (f) heating the work head of the press member thereby to soften the part of the outer skin member; (g) separating the work head of the press member away from the projections of the lower mold; and (h) pouring a liquid material for foamed plastic into the cavity and curing the same.

6 Claims, 1 Drawing Sheet

METHOD OF PRODUCING SKIN-COVERED PAD FOR SEAT

BACKGROUND OF THE INVENTION

1. Field of the Invention

The present invention relates in general to a method of producing a skin-covered pad of a seat, and more particularly to a method of producing a skin-covered pad which has decorative grooves formed on a front face thereof.

2. Description of the Prior Art

Hitherto, in the field of seat manufacturing, a so-called "skin covered pad" has been widely used as a cushion member of a seat cushion and/or a seatback. The skin-covered pad is arranged on the seat structure with its front face exposed to the outside. Usually, the skin-covered pad is produced by pouring a liquid material for foamed polyurethane or the like into a bag-shaped outer skin member held in a mold, and thereafter, curing the same in a suitable manner.

In order to improve the external appearance, some of the skin-covered pads are provided at their front faces with a plurality of decorative grooves or the like.

One of the methods for producing such grooves is disclosed in Japanese Patent First Provisional Publication No. 60-160990. In this method, the decorative grooves are previously provided to the bacg-shaped outer skin member before the skin member is subjected to the molding of the polyurethane foam. That is, the bag-shaped outer skin member with the grooves is put into a mold, and thereafter, a liquid material for foamed polyurethane is poured into the skin member and cured in a known manner. In order to properly hold the skin member, the mold has at it cavity bottom a corresponding number of projections for engagement with the grooves of the skin member.

However, providing the grooves to the skin member prior to the urethane molding increases the number of production steps of the skin-covered pad. Furthermore, proper positioning of the skin member to the mold is difficult or at least troublesome due to provision of the projections on the cavity bottom of the mold. In fact, if the urethane molding is carried out with the grooves of the skin member mismatched with the corresponding projections of the mold, an inferior product is inevitably produced.

SUMMARY OF THE INVENTION

It is therefore an object of the present invention to provide a method of providing a skin-covered pad having decorative grooves or recesses formed thereon, which method is free of the above-mentioned drawbacks.

According to the present invention, there is provided an improved method of producing a skin-covered pad for a seat. The method comprises the following steps (a) preparing a lower mold which has a cavity formed therein, the mold having projections on a bottom of the cavity; (b) putting a bag-shaped outer skin member into the cavity, the skin member being thermally plastic; (c) putting an upper mold on the lower mold to close the cavity, the upper mold having an aperture formed therethrough; (d) projecting a press member into the cavity through the aperture, the press member having at its work head recesses which are shaped to match with the projections of the lower mold; (e) pressing the recessed work head of the press member against the projections of the lower mold with an interposal of a part of the outer skin member therebetween; (f) heating the work head of the press member thereby to soften the part of the outer skin member; (g) separating the work head of the press member away from the projections of the lower mold; and (h) pouring a liquid material for foamed plastic into the cavity and curing the same.

According to the present invention, there is further provided a mold assembly for producing a skin-covered pad. The mold assembly comprises a lower mold having a cavity formed therein, the mold having projections formed on a bottom of the cavity; an upper mold which is to be put on the lower mold to close the cavity, the upper mold having an aperture formed therethrough; and a heating press which is to be projected into the cavity through the aperture of the upper mold, the heating press having at its work head recesses which are shaped to match with the projections of the lower mold.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a method according to the present invention will be described in detail with reference to the accompanying drawings.

Figure 1:
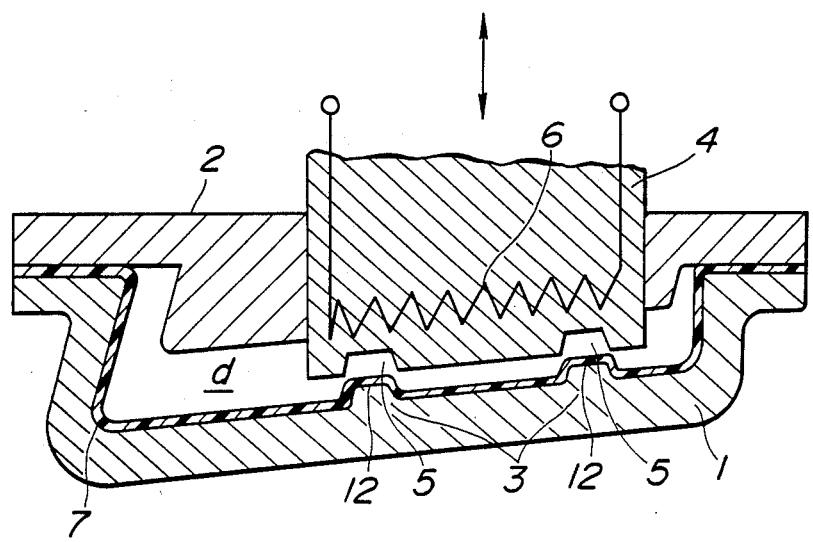
FIG. 1 is a sectional view of a mold assembly which is used in a method according to the present invention.

FIG. 1 shows a mold assembly which is used in the method of the invention.

In the drawing, numeral 1 denotes a lower mold having a cavity "d" which is shaped to match with the contour of a seat cushion to be produced. Numeral 2 denotes an upper mold which is put on the lower mold 1 to close the cavity "d" of the latter.

The bottom surface of the cavity of the lower mold 1 has a plurality of ridges 3 or projections integrally formed thereon. The upper mold 2 is formed with an aperture (no numeral) through which a heating press 4 is projected into the cavity "d". The heating press 4 has a heater wire 6 embedded therein. Although not shown, a hydraulic cylinder is incorporated with the heating press 4 to move the same through the aperture of the upper mold 2.

The heating press 4 is formed at its work head with grooves 5 or recesses which are snugly engageable with the ridges 3 (or projections) of the lower mold 1.

In the following, the steps for producing the skin-covered pad will be described.

First, a bag-shaped outer skin member 7 is prepared. The outer skin member is constructed of a layered material which comprises a thermoplastic leather (such as, polyvinyl leather, polyethylene leather or the like) and a wadding lined on one side of the thermoplastic leather. It is to be noted that unlike the case of the above-mentioned conventional method, the bag-shaped outer skin member 7 has a flat outer surface.

Then, the outer skin member 7 is put into the cavity "d" of the lower mold 1 having the outer surface thereof intimately contacted with the wall of the cavity "d". Then, the upper mold 2 is put on the lower mold 1. With this, the peripheral edge of the skin member 7 is unmovably held between respective peripheral portions of the two molds 1 and 2 as is understood from FIG. 1.

Then, the heating press 4 is put into the aperture of the upper mold 2 and projected into the cavity "d" of the lower mold 1 by such a degree that the grooves 5 of the work head of the heating press 4 are snugly coupled with the ridges 3 of the lower mold 1 with an interposal of the skin member 7 therebetween. Then, the heating wire 6 is energized to heat the press 4. With this, due to the nature of the thermoplastic leather 7, the portions of the skin member 7 which have been pressed between the ridges 3 of the lower mold 1 and the grooves 5 of the upper mold 2 are softened and thus intimately lined over the ridges 3 of the lower mold 1, as will be seen from FIG. 1.

Then, the heater wire 6 is deenergized to cool the press 4. Thereafter, a liquid material for a foamed polyurethane is poured into the cavity "d" through an opening (not shown) formed in the upper mold 2 while lifting the press 4 to a given position where the work head of the press 4 is flush with an inner wall (no numeral) of the upper mold 2. With this, the cavity "d" is filled with the liquid urethane material.

Figure 2:
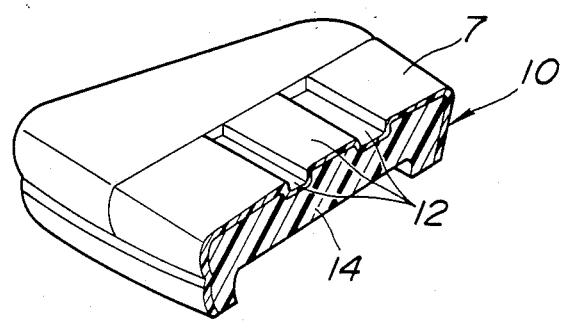
FIG. 2 is a partially cut perspective view of a skin-covered pad produced by the method of the invention.

After the material is hardened to a sufficient level, the upper mold 2 is dismantled from the lower mold 1 together with the heating press 4. Then, a product, viz., a skin-covered pad 10 with the grooves 12 as shown in FIG. 2, is picked out from the lower mold 1. Since the grooves 12 of the bag-shaped outer skin member 7 are produced by the mold assembly, there is no need of handling the skin member 7 for the positioning thereof relative to the lower mold 1 before molding of the urethane foam. This improves considerably the production efficiency of the skin-covered pad. In fact, the aforementioned mismatching between the grooves on the skin member and the projections on the cavity bottom of the mold does not occur.

What is claimed is:

1. A method of producing a skin-covered pad for a seat, comprising by steps:
    (a) preparing a lower mold which has a cavity formed therein, said mold having projections on a bottom of said cavity;
    (b) putting a bag-shaped outer skin member into said cavity, said skin member being thermally plastic;
    (c) putting an upper mold on said lower mold to close said cavity, said upper mold having an aperture formed therethrough;
    (d) projecting a press member into said cavity through said aperture, said press member having at its work head recesses which are shaped to match with said projections of the lower mold;
    (e) pressing the recessed work head of the press member against said projections of the lower mold with an interposal of a part of the outer skin member therebetween;
    (f) heating said work head of the press member thereby to soften said part of the outer skin member;
    (g) separating said work head of the press member away from said projections of the lower mold; and
    (h) pouring a liquid material for foamed plastic into said cavity and curing the same.
2. A method as claimed in claim 1, in which the step (g) is carried out while the step (h) is being carried out.
3. A method as claimed in claim 2, in which said step (g) includes a step (i) of moving said press member to such a position where a front surface of said work head of the press member is flush with an inner wall of said upper mold.
4. A method as claimed in claim 3, in which the step (f) is achieved by energizing a heater wire embedded in said work head of the press member.
5. A method as claimed in claim 4, in which said bag-shaped outer skin member is constructed of a layered material which comprises a wadding lined with a thermoplastic leather.
6. A method as claimed in claim 4, in which the step (c) is so made that a peripheral edge of the skin member is unmovably held between respective peripheral edges of said lower and upper molds.

* * * * *